(12) United States Patent
Meyer et al.

(10) Patent No.: US 11,765,039 B2
(45) Date of Patent: Sep. 19, 2023

(54) SYSTEM AND METHOD FOR OPTIMIZING DEPLOYMENT OF A PROCESSING FUNCTION IN A MEDIA PRODUCTION WORKFLOW (71) Applicant: Grass Valley Canada, Montreal (CA)

(72) Inventors: Charles S. Meyer, Montreal (CA); James Westland Cain, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/351,793

(22) Filed: Jun. 18, 2021

(65) Prior Publication Data

US 2022/0052922 A1 Feb. 17, 2022

Related U.S. Application Data (60) Provisional application No. 63/065,073, filed on Aug. 13, 2020.

(51) Int. Cl.
*H04L 41/12* (2022.01)
*H04L 67/10* (2022.01)
(Continued)

(52) U.S. Cl.
CPC ........... *H04L 41/12* (2013.01); *G06F 8/60* (2013.01); *G06F 9/4843* (2013.01);
(Continued)

(58) Field of Classification Search
CPC ........ G06F 9/4843; G06F 8/60; G06F 16/252; H04L 47/827; H04L 67/10; H04L 41/12
See application file for complete search history.

(56) References Cited

U.S. PATENT DOCUMENTS 9,407,944 B1 8/2016 Galdy et al.
9,882,828 B1 * 1/2018 Sandlerman ............ H04L 47/74
(Continued)

FOREIGN PATENT DOCUMENTS

CN 109981778 A * 7/2019

OTHER PUBLICATIONS

International Search Report and Written Opinion of the International Searching Authority issued in connection with PCT/CA2021/050910, dated Sep. 9, 2021.

*Primary Examiner* — Shean Tokuta
(74) *Attorney, Agent, or Firm* — ARENTFOX SCHIFF LLP (57) ABSTRACT

A system is provided for optimizing deployment of a processing function in a media production workflow. The system includes a media production workflow generator that builds the media production workflow that includes the processing function and determines deployment criteria that includes an input dataset for the processing function and an atomic compute function for executing the processing function. Moreover, a deployment topology generator generates a topologies of the resources available in a cloud computing network and based on the determined deployment criteria, with the generated topologies indicating different configurations of resources for executing the processing function and a processor for executing the atomic compute function of the processing function. Furthermore, a deployment optimizer selects an optimal topology to deploy the processing function within the cloud computing network, with the optimal topology selected to include the processor for optimizing accessibility of electronic memory to execute the atomic compute function.

21 Claims, 6 Drawing Sheets

(51) Int. Cl.
G06F 16/25 (2019.01)
G06F 8/60 (2018.01)
G06F 9/48 (2006.01)
H04L 47/70 (2022.01)

(52) U.S. Cl.
CPC .......... G06F 16/252 (2019.01); H04L 47/827 (2013.01); H04L 67/10 (2013.01)

(56) References Cited

U.S. PATENT DOCUMENTS

| | | | |
|---|---|---|---|
| 10,180,768 B1* | 1/2019 | Capano | G06F 3/04842 |
| 10,402,227 B1* | 9/2019 | Kinney, Jr. | G06F 9/5011 |
| 11,029,915 B1* | 6/2021 | Vercellotti | H04H 60/04 |
| 2004/0030782 A1* | 2/2004 | Nakahara | G06F 11/3452 |
| | | | 714/E11.197 |
| 2004/0054854 A1* | 3/2004 | Thiyagaranjan | G06F 12/0815 |
| | | | 711/141 |
| 2008/0147835 A1* | 6/2008 | Chandra | H04L 67/02 |
| | | | 709/223 |
| 2012/0042055 A1* | 2/2012 | Agarwala | H04L 41/5054 |
| | | | 709/220 |
| 2013/0268674 A1* | 10/2013 | Bailey | H04L 47/829 |
| | | | 709/226 |
| 2014/0068560 A1* | 3/2014 | Eksten | G06F 8/70 |
| | | | 717/120 |
| 2014/0317167 A1* | 10/2014 | Wahl | G06F 9/5027 |
| | | | 709/201 |
| 2014/0359128 A1* | 12/2014 | Bhattacharya | G06F 9/4856 |
| | | | 709/226 |
| 2015/0142934 A1* | 5/2015 | Craine | H04W 4/50 |
| | | | 709/221 |
| 2015/0169383 A1* | 6/2015 | van den Berghe | G06F 11/3409 |
| | | | 718/104 |
| 2015/0212857 A1 | 7/2015 | Beveridge | |
| 2015/0281316 A1* | 10/2015 | Bragstad | H04L 67/563 |
| | | | 709/224 |
| 2016/0210578 A1* | 7/2016 | Raleigh | H04W 88/08 |
| 2016/0381128 A1* | 12/2016 | Pai | G06F 9/46 |
| | | | 709/203 |
| 2017/0024259 A1* | 1/2017 | Mecklin | H04L 69/24 |
| 2018/0285794 A1* | 10/2018 | Gray-Donald | G06F 9/5005 |
| 2019/0065249 A1* | 2/2019 | Cheng | G06F 9/4881 |
| 2021/0004273 A1* | 1/2021 | You | G06F 9/5027 |
| 2021/0105338 A1* | 4/2021 | Oyman | H04L 67/146 |
| 2021/0117307 A1* | 4/2021 | MacNamara | G06F 11/302 |
| 2021/0144056 A1* | 5/2021 | Chakrapani Rangarajan | H04L 41/5012 |

* cited by examiner

SYSTEM AND METHOD FOR OPTIMIZING DEPLOYMENT OF A PROCESSING FUNCTION IN A MEDIA PRODUCTION WORKFLOW

CROSS REFERENCE TO RELATED APPLICATIONS

The present application claims priority to U.S. Patent Provisional No. 63/065,073, filed Aug. 13, 2020, the contents of which are hereby incorporated by reference in its entirety.

TECHNICAL FIELD

The system and method disclosed herein is related to media production, and, more particularly, to a system and method for dynamically optimizing deployment of a processing function in a media production workflow.

BACKGROUND

Live media production typically involves capturing media content from one or a plurality of live scenes (e.g., a sports venue, news broadcast, video game platforms, and the like), transmitting the captured content to a remote production facility where the video and audio signals are managed by production switchers, graphics effects are added, and the like, and then the processed signals are encoded for transport to a distribution network, such as a television broadcasting network, through one or a plurality of signals. More recently, broadcasting and media production has evolved from analog to digital domain and across various protocols (e.g., MPEG-2 transport streams, Internet Protocol (IP), IPTV, HTTP streaming). In IP technology, there are myriad tools, software code bases, and the like, that present an infinite set of combinations, or development efforts, which lead to a final "product" (e.g., a media production) through execution of media production workflows that incorporate these tools.

With the continuous growth, development and accessibility of cloud computing platforms and networks, such as Amazon Web Service® ("AWS"), many of the processing components involved in a typical media production environment to generate the final product are being moved to "the cloud" and/or being distributed broadly across a number of geographical locations. In the cloud, infrastructure as code (IAC) and configuration as code (CAC) provide for a very dynamic infrastructure that is effectively a software defined processing capability that enables software execution of each desired task at hand. In this case, code modules may be assigned identity, compilers for the code are assigned identity, the IAC and CAC are assigned identity, and the like, to execute these tasks However, even with the dynamic software defined processing capabilities that these cloud computing environments present, a problem exists in how to identify and optimize resources of the computing environments to efficiently and economically execute processing functions within a media production workflow.

SUMMARY OF THE INVENTION

Accordingly, a system and method are provided for dynamically optimizing deployment of a processing function in a media production workflow.

In an exemplary aspect, the processing function $f(x)$ is a behavioral, mathematical function that is specialized based upon an input data set and timing constraints. Different machines (or combinations thereof) within a cloud computing can be configured to execute to meet the requirements of the processing function $f(x)$.

In particular, the system and method provided herein can be configured to mutate or otherwise deploy the machine(s) that execute function $f(x)$, such that the memory load for the function $f(x)$ is optimized for that machine. Moreover, memory access variability is typically bounded in North/South, and East/West configurations. East/West may be further bounded by use of RDMA (e.g., RoCE) and by Cloud to Cloud. However, according to an exemplary aspect, the compute engines deployed for the function $f(x)$ may be interconnected via fully, or partial mesh fabric, within the cloud computing network, and, thus, remove the arbitrary boundaries of "hub and spoke" networks, so widely deployed today.

In another exemplary aspect, the function $f(x)$ can be considered an interface between a "compute" device and the required implementation of memory access to meet the requirement of processing the function $f(x)$ when the memory access and compute time are variable, scalable, elastic and apriori unknown.

In yet another exemplary aspect, the system and method is configured to exploit stability and durability of the processing function $f(x)$ to select an optimum compute type (e.g., an optimal deployment within the cloud computing network). In other words, the system and method is configured to determine the stability for the inputs of function $f(x)$ and what data function $f(x)$ operates upon them. Assuming the system knows the sequence order of the workflow and the sequence span for duration of said stability, the system and method can further dynamically change to a different topology, such that the functions $f(x)$ is again more stably, and optimally executed.

In yet a further aspect, the function $f(x)$ is composite operation that can be decomposed into a plurality of atomic functions. As such, the memory access is optimizable and the machine itself configurable and optimizable such that operations, such as decimation and DCTs and the like, can be carried out by any machine with the data set input applied to function $f(x)$.

In another exemplary aspect, the compute engines for the function $f(x)$ can be any type of machine, such as an FPGA, a CPU, and/or a GPU. The mismatch or differences between the machines can be selected for use to implement function $f(x)$, which leads to provide optimizable criteria. As such, network type, network bandwidth, network latency, compute type, compute location and placement, which interact with topology, and the given function $f(x)$ and its data, but also have independent performance criteria, can be used for optimization and then selections made to optimize cost.

According to an exemplary embodiment, a system is provided for optimizing deployment of a processing function in a media production workflow. In this aspect, the system includes a media processing resource database comprising metadata associated with a plurality of resources available in a cloud computing network that includes both physical resources and software resources, with the resources comprising a plurality of processors and electronic memory accessible by the plurality of processors. Moreover, the system can include a media production workflow generator configured to build the media production workflow that includes the processing function and to determine deployment criteria for the processing function that includes an input dataset for the processing function and at least one atomic compute function for executing the processing function within the generated media production workflow. The system further includes a deployment topology generator configured to generate a plurality of topologies of the plurality of resources available in the cloud computing network and based on the determined deployment criteria, with the generated plurality of topologies indicating different configurations of the physical and software resources for executing the processing function and at least one of the plurality of processors configured for executing the atomic compute function of the processing function. Yet further, the system includes a deployment optimizer configured to select an optimal topology of the plurality of topologies to deploy the processing function within the cloud computing network, with the optimal topology being selected to include the at least one processor for optimizing accessibility of the electronic memory to execute the atomic compute function, and the accessibility optimized based on at least one of a network type, network bandwidth, network latency, processor type, and processor location within the cloud computing network. In an exemplary aspect, the plurality of processors includes at least one computer processing unit (CPU), at least one graphics processing unit (GPU), and at least one field programmable gate array (FPGA). Moreover, in another aspect, the deployment topology generator is configured to generate the plurality of topologies such that the processing function is executed at or below a maximum time threshold.

In another exemplary embodiment, the deployment optimizer dynamically selects a different topology of the plurality of topologies to deploy the processing function within the cloud computing network in response to a change of at least one of a format and a type of the input dataset.

In yet another exemplary embodiment, the deployment optimizer is further configured to decompose the processing function into a plurality of atomic functions that are allocated to respective resources of the plurality of resources available in the cloud computing network.

In yet another exemplary embodiment, the deployment optimizer is further configured to select the optimal topology of the plurality of topologies based on availabilities and capabilities of the plurality of resources in the cloud computing network.

In yet another exemplary embodiment, the deployment topology generator is configured to query the media processing resource database to identify the plurality of resources available in the cloud computing network and the respective capabilities of the plurality of resources. Moreover, in one aspect, each resource of the plurality of resources available in the cloud computing network comprises a unique resource ID that includes metadata indicating the capabilities of the respective resource, such that the deployment topology generator is configured to generate the plurality of topologies of the plurality of resources available in the cloud computing network based on the unique resource ID for each resource.

In yet another exemplary embodiment, the input dataset comprises video content provided by at least one content generating device for production a media production by the media production workflow and the processing function comprises at least one of image scaling, encoding and decoding of the video content.

In an additional exemplary embodiment, a system is provided for optimizing deployment of a processing function in a media production workflow that includes a media processing resource database comprising metadata associated with a plurality of resources available in a cloud computing network that includes both physical resources and software resources, with the resources comprising a plurality of processors and electronic memory accessible by the plurality of processors; a media production workflow generator configured to build the media production workflow that includes the processing function and to determine deployment criteria for the processing function that includes an input dataset for the processing function and at least one atomic compute function for executing the processing function within the generated media production workflow; a deployment topology generator configured to generate a plurality of topologies of the plurality of resources available in the cloud computing network and based on the determined deployment criteria, with the generated plurality of topologies indicating different configurations of the physical and software resources for executing the processing function and at least one of the plurality of processors configured for executing the atomic compute function of the processing function; and a deployment optimizer configured to select an optimal topology of the plurality of topologies to deploy the processing function within the cloud computing network, with the optimal topology being selected to include the at least one processor for optimizing accessibility of the electronic memory to execute the atomic compute function.

In an additional exemplary embodiment, a system is provided for optimizing deployment of a processing function in a media production workflow that includes a media production workflow generator configured to build the media production workflow that includes the processing function and to determine deployment criteria for the processing function that includes an input dataset for the processing function and at least one atomic compute function for executing the processing function within the generated media production workflow; a deployment topology generator configured to generate a plurality of topologies of a plurality of resources available in a cloud computing network and based on the determined deployment criteria, with the generated plurality of topologies indicating different configurations of physical and software resources for executing the processing function and at least one of a plurality of processors configured for executing the atomic compute function of the processing function; and a deployment optimizer configured to select an optimal topology of the plurality of topologies to deploy the processing function within the cloud computing network, with the optimal topology being selected to include the at least one processor for optimizing accessibility of electronic memory to execute the atomic compute function.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the function deployment optimization system will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Figure 1:
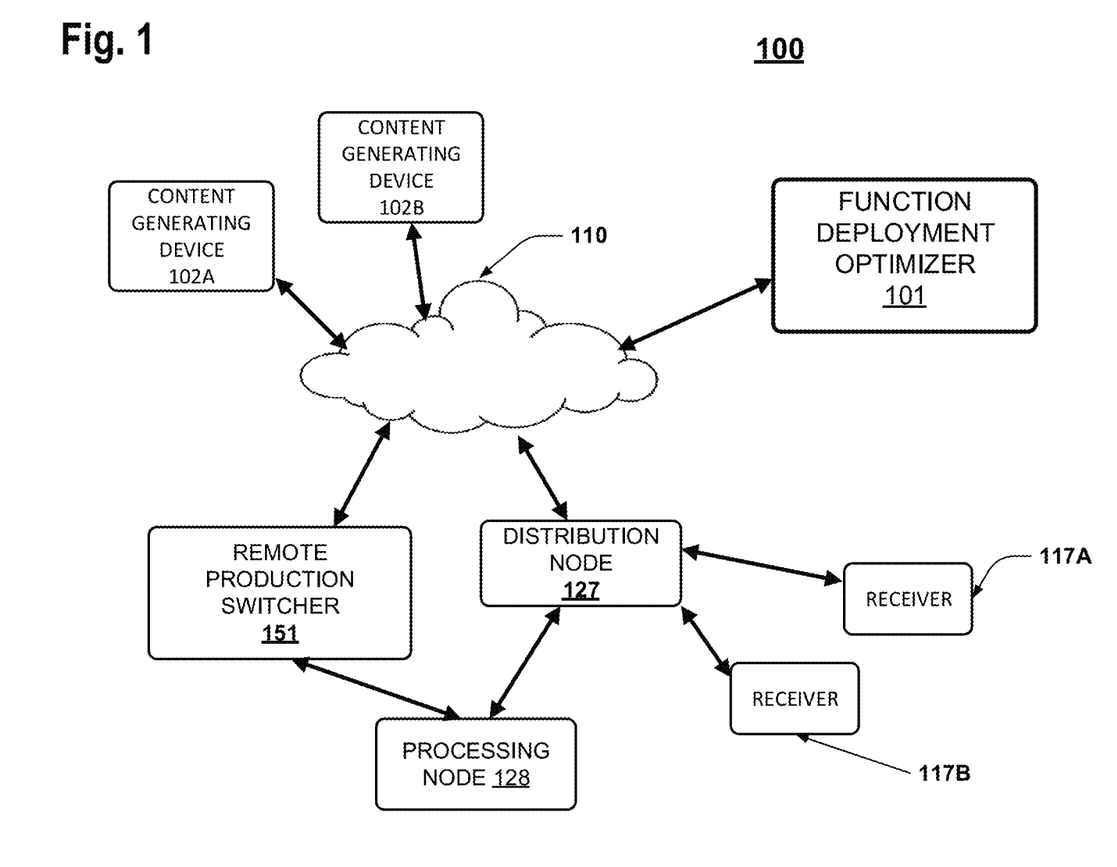
FIG. 1 illustrates a block diagram of a system for optimizing deployment of a processing function in a media production workflow according to an exemplary embodiment.

FIG. 1 illustrates a block diagram of a system for dynamically optimizing deployment of a processing function in a media production workflow according to an exemplary embodiment. As will be described in detail below, the exemplary system 100 can include a design interface tool (e.g., a computer-aided design (CAD) software tool and user interface) that is configured to dynamically manage and optimize functions executed as part of a workflow in a media production environment. In general, media content provided for production according to system 100 is generally referred to as "essence", which denotes media that can be consumed by a user (e.g., a video clip, an audio clip, and/or ancillary data such as captions). As will be described in detail herein, the function deployment optimization system enables dynamic and optimal deployment of processing functions to the cloud for performing different types of work on the media essence in a media production workflow.

As shown, the system 100 includes a function deployment optimizer 101, which is the software tool or module (e.g., implemented on one or more computer processing devices) that is configured to deploy a processing function in a cloud computing environment according to the algorithms and techniques described herein. It is also noted that while the exemplary embodiment is described in the context of media production and specifically live or real-time media production or broadcast, the disclosed system and method can be implemented to deploy a processing function as part of a workflow for any number of industries as a technique to optimize a development technology (e.g., a manufacturing factory). That is, the function deployment optimizer 101 can equally be implemented as a factory optimization tool in various software and hardware manufacturing and creation environments.

FIG. 1 illustrate a block diagram that is specific to a live media production environment. As described above, the function deployment optimizer 101 is configured to deploy a function (e.g., a processing function) as a component(s) or node(s) of a media production workflow. Thus, the function deployment optimizer 101 can generally be located remotely from all of the other components in the system and, in some embodiments, coupled to the components (which are part of a cloud computing environment/network) to effectively deploy and optimize the function. Thus, the components shown in system 100 are provided as an exemplary system.

In general, the processing function can be considered a required function f(x) for the workflow that is specialized based on an input data set. Moreover, function f(x) can be a directed acyclic graph that can be decomposed to one or more atomic compute functions, such that there is no reentry of data to the function (i.e., the function f(x) is stateless). In other words, the function f(x) can be decomposed into one or more atomic compute functions that can be deployed on one or more processing components of the cloud network. As described in detail below, the function deployment optimizer 101 is configured to determine an optimal deployment (e.g., mutate the machine and/or select different machines) to meet the requirements of the function f(x) while optimizing the memory load for the stated function.

Exemplary functions can include multi-viewer generation, with each atomic compute function being, for example, downward image scaling to display a plurality of video feeds (e.g., input and output feeds) as inputs for the single interface of the multi-viewer. Another exemplary processing function for the workflow can include, for example, one or more codecs configured to encode and/or decode the video signals at a particular compression format for the transmission to satisfy the media request parameters. In general, such codecs are configured to perform encoding and decoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.). The one or more codecs are provided to compress the media content for transmission through the network. It is reiterated that the deployed function f(x) can be any type of processing function that is required to execute a media production workflow, for example.

As further shown, system 100 includes a plurality of content generating devices 102A and 102B, which can be configured for an A/V feed across links via the network 110. Moreover, it is noted that while only two devices are shown, the system 100 can be implemented using any number of content generating devices. The plurality of content generating devices 102A and 102B can also include, for example, remote cameras configured to capture live media content, such as the "talent" (e.g., news broadcasters, game commentators, or the like). Moreover, the content generating devices 102A and 102B can include Esports (e.g., electronic sports) real-time content, or the like. In general, it should be appreciated that while the exemplary aspect uses content generating devices 102A and 102B (which may be located at a live event, for example), a similar configuration can be used for any type of content providing device, such as a remote video server, for example, that is configured to store media content and distribute this content through the media distribution network.

As further shown, the plurality of content generating devices 102A and 102B can be coupled to a communication network 110, such as the Internet, and/or hardware conducive to internet protocol (IP). That is, system 100 can be comprised of a network of network servers and network devices configured to transmit and receive video and audio signals (e.g., media essence) of various formats. In an exemplary aspect, the communication network 110 and processing components thereof can be executed in a cloud computing environment/network. Moreover, in one aspect, essence, such as video content, that is generated (or otherwise provided) by the content generating devices 102A and 102B can be provided as an input data set for the processing functions f(x) deployed to the cloud as described herein.

In general, cloud computing environments or cloud platforms are a virtualization and central management of data center resources configured as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. As will be described in detail below, the function deployment optimizer 101 is configured to access metadata for the plurality of cloud computing resources available for the media production workflow and deploy one or more processing functions f(x) for the media production based on optimized topologies.

In any event, as yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of the cloud computing environment 101. The one or more distribution nodes 127 (e.g., electronic devices) are configured to distribute the production media content to one or more distributed nodes (e.g., remote media devices), such as receivers 117A and 117B, which can be content consuming devices (e.g., televisions, computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content. It should also be appreciated that each of the nodes/components shown in system 100 comprise nodes of a media product workflow as would be appreciated to one skilled in the art.

In this network, distribution node(s) 127 can further be configured to distribute the media content throughout the distribution network to one or more processing node(s) 128, which may include a mix/effects engine, keyer or the like. Examples of processing node(s) 128 may include remote production switches similar to remote production switcher 151 or remote signal processors and can be included in the cloud computing environment in an exemplary aspect.

Figure 2:
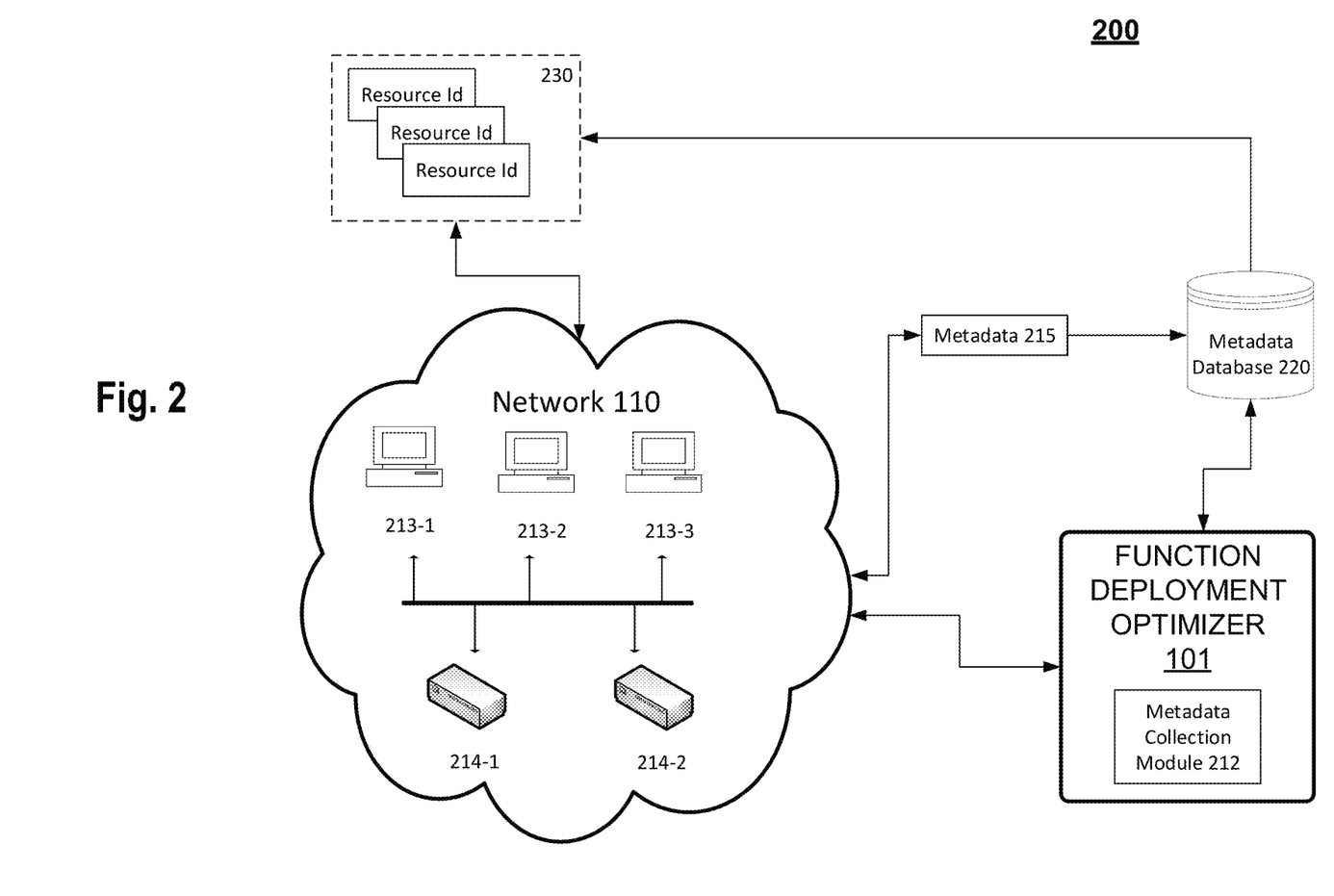
FIG. 2 illustrates another block diagram of a system for optimizing deployment of a processing function in a media production workflow according to an exemplary embodiment.

FIG. 2 illustrates another block diagram of a system 200 for dynamically optimizing deployment of a processing function in a media production workflow according to an exemplary embodiment. In particular, it should be appreciated that FIG. 2 illustrates a more detailed block diagram system 200 that includes the function deployment optimizer 101 and cloud computing network 110 of system 100. That is, system 200 illustrates a more detailed subset of the components of system 100 in an exemplary aspect.

As described above, the function deployment optimizer 101 can be implemented on a computer or similar computing device. Moreover, the function deployment optimizer 101 is coupled to a metadata database 220. The metadata database 220 can be configured as a media processing resource database that receives metadata 215 from the cloud computing network 110. This metadata 215 identifies available resources in the cloud computing network 110 that can include, for example, both physical resources and software resources as described above.

According to the exemplary embodiment, the function deployment optimizer 101 (e.g., a deployment topology generator) is configured to query the metadata database 220 to determine the available resources that are configurable and available to execute the desired function f(x) according to defined requirements/criteria to provide the client device with a blueprint for resource allocation and function f(x) deployment for the media production workflow. Resource identifiers 230 are also provided from the cloud computing network 110 to the metadata database 220 and can be returned to the function deployment optimizer 101 so the function deployment optimizer 101 can generate one or more resource allocation topologies for deploying the function f(x) and optimally complete the desired task for satisfying user requirements. In exemplary aspects, the resource identifiers 230 may include metadata descriptors of the type of resource, a make of the resource, capabilities of the resource, usage parameters and availabilities (including time) for the resource, network location and other linked resources. In exemplary aspects, the resource type may be physical (e.g., a computing device, mobile device, microchip, or other internet connected device, or the like), software based (e.g., a software application, a software service, a cloud computing platform, or the like), or the like. The capabilities of the resource enable the function deployment optimizer 101 to deploy the function f(x) to meet the requirements. Furthermore, the resource may be associated with one or more linked resources, whether of the same or of a different type, that may optionally be invoked by the returned resource.

According to the exemplary embodiment, the function deployment optimizer 101 can include a metadata collection module 212 that is configured to collect metadata information from the plurality of resources in the cloud computing network 110. It is noted that while metadata collection module 212 is shown as a component of function deployment optimizer 101, it can be a standalone component or module associated with metadata database 220 in alternative aspects. In general, the term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

An illustrative set of resources 213-1 to 213-3 and 214-1 to 214-2 is shown in FIG. 2 and represents exemplary available resources in cloud computing network 110. In an aspect, each resource 213-1 to 213-3 and 214-1 to 214-2 can be a device (either tangible or virtual) that has a resource ID 230, that is associated with a respective resources and which has a unique relationship to its respective metadata. The resource IDs 230 can be stored remotely in a cloud computing environment (e.g., as shown by dashed lines of 130) and/or directly stored by the resources 213-1 to 213-3 and 214-1 to 214-2 themselves, for example. In either case, the device IDs 230 are associated with the metadata for each respective resources 213-1 to 213-3 and 214-1 to 214-2.

According to an exemplary aspect, resources 213-1 to 213-3 are a plurality of processing devices configurable for executing processing functions f(x) in a media processing workflow and resources 214-1 to 214-2 are accessible memory (e.g., RAM, cache or the like) that can be accessed by the plurality of processing devices to execute the requested function. In a refinement of the exemplary aspect, resource 213-1 is at least one computer processing unit (CPU), resource 213-2 is at least one graphics processing unit (GPU), and resource 213-3 is at least one field programmable gate array (FPGA). It should be appreciated that the resources can be any combination of these components in various exemplary aspects.

According to the exemplary embodiment, the metadata collection module 212 is configured to dynamically collect and/or receive metadata information (including capabilities and availabilities) of various and many other devices. For example, the metadata collection module 212 can be configured to query a list of available resources (e.g., resources 213-1 to 214-2) in which each resource is being linked to and shares its unique identity. In one aspect, the unique identity can be an attribute filed in its metadata record. In another exemplary aspect, the unique identity for a resource can be composed of a number of logically grouped identities.

In another exemplary aspect, a list of resource locators is provided to the metadata collection module 212, and the module 212 is configured to communicate with the resources to receive metadata records that are associated with the unique resource ID for that resource. Alternatively, in some aspects, a resource may be smart, connected to the Internet (for example in the cloud environment), and may be configured to submit metadata information to listening servers, submitted to the metadata collection module 212. The collected (or otherwise provided) metadata 215 is stored in metadata database 220. Once a request to find and deploy a function to one or more resources in the cloud computing network 110 is generated, the function deployment optimizer 101 is invoked to retrieve resource IDs 230 to determine available and relevant resources for executing the processing function. The optimizer will determine the best configuration of these resources.

In an exemplary aspect of the present disclosure, the function deployment optimizer 101 can be configured to establish a unique identify for each of the resources whose metadata is collected, the identity establishing the capabilities and capacity of the given resource. In one example, the unique identity for IoT or other connected devices can be assigned by a process, similar to DHCP (dynamic host configuration protocol). For example, a physical device could provide its MAC address, or, alternatively, a virtual device could provide a unique address based upon the port MAC and the served IP address. The AMWA IS-05 specification uses LLDP as a way to initiate a connection, and create a unique ID for a virtual resource. It should be appreciated that there is no loss of generality with such method when considering transient devices: one which are spun up, and then later spun down. Accordingly, actual deployment and configuration of the available resource by the function deployment optimizer 101 can be executed using these known techniques in an exemplary aspect.

Figure 3:
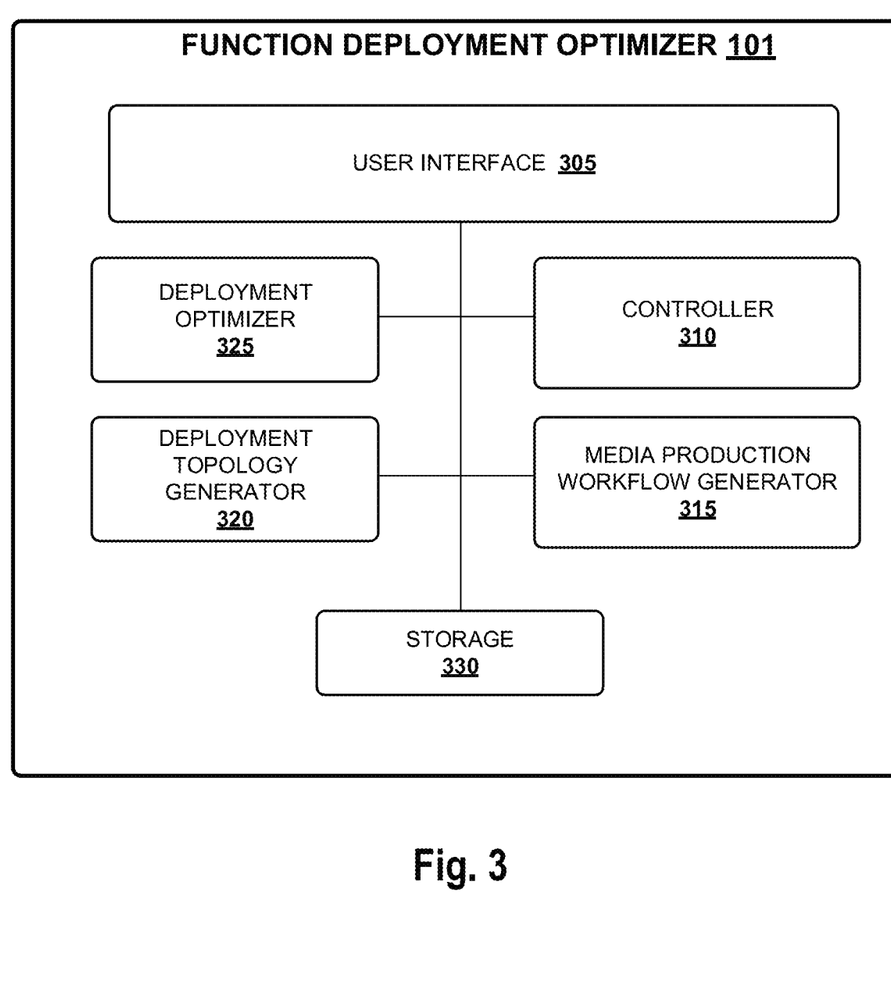
FIG. 3 illustrates a block diagram of a function deployment optimizer for optimizing deployment of a processing function in a media production workflow according to an exemplary embodiment.

FIG. 3 illustrates a block diagram of a function deployment optimizer 101 for dynamically optimizing deployment of a processing function in a media production workflow according to an exemplary embodiment. The function deployment optimizer 101 can be implemented on one or more computing devices that is communicatively coupled to the network 110 for media production as shown above. Moreover, the function deployment optimizer 101 includes a plurality of components and/or modules for executing the algorithms and techniques described herein.

More specifically, the media production optimizer 101 includes a user interface 305, a controller 310, a media production workflow generator 315, a deployment topology generator 320, a deployment optimizer 325 and storage 330. In general, the storage 330 can be implemented as electronic memory configured to store the one or more deployment topologies, function deployment criteria, and the like. Moreover, each of these components can be implemented as software engines or modules configured for executing the algorithms disclosed herein.

As described above, the system 100 is provided to configure one or more "machines" in a cloud computing environment to deploy a function f(x) to be executed as part of a media production workflow. Thus, according to the exemplary aspect, the controller 310 is configured to generate and/or access a user interface 305 on a screen of the computing device, for example, that enables a user to define the media production workflow and/or to set criteria and to further select a topology for deploying each function in the cloud computing environment.

In operation, the media production workflow generator 315 is configured to build a media production workflow that includes the processing function(s) f(x) executed within the workflow to produce the media content. More particularly, a media production workflow typically can include a plurality of nodes therein that are each designed and designated to perform a particular task or operation for the workflow (e.g., encoding, multi-view, routing and switching of media signals, and the like). An exemplary system for building a media production workflow is described in U.S. patent application Ser. No. 17/324,001, filed May 18, 2021, and entitled "System and Method for Generating a Factory Layout for Optimizing Media Content Production", the contents of which are incorporated by reference in its entirety.

The media production workflow generator 315 is configured to define and/or customize a media production workflow, including to design and set (or otherwise select) one or more functions f(x) to be executed as part of the workflow. In this regard, the media production workflow generator 315 is further configured to determine deployment criteria for the processing function f(x) that includes an input dataset for the processing function f(x) and at least one atomic compute function for executing the processing function f(x) within the context of the generated media production workflow. In other words, the deployment criteria can define the type of input data (e.g., one frame, a plurality of lines of pixel data, or the like) and a required time (e.g., a time threshold) for computing the task.

Based on the deployment criteria, the deployment topology generator 320 is configured to generate, based on the determined deployment criteria, one or, more preferably, a plurality of topologies of the plurality of resources available in the cloud computing network. In other words, the deployment topology generator 320 is configured to identify the available resources (e.g., processors 213-1 to 213-3 and memory 214-1 to 214-2) within the network 110 using the resource IDs 230 and metadata 215, as described above, and to develop possible topologies (e.g., different configurations) of these resources to deploy and execute the requested function of the workflow. In general, the different topologies will offer different outcomes for the user and the workflow, but for executing the same function. For example, a first topology may offer a faster execution (e.g., parallel processing using a plurality of GPU) at a higher cost, whereas a second topology may offer a slower execution (e.g., less GPUs), but also at a lower economic cost for the workflow.

According to an exemplary aspect, the generated plurality of topologies indicate different configurations of these physical and software resources for executing the processing function f(x) and can specify or predetermine the different outcomes of each combination according to time, content quality, formatting, and the like, for example. That is, it should be appreciated that based on the location of memory 214-1 to 214-2 within the network 110, the configurations will have different abilities and different latency constraints for executing the function f(x). Moreover, each of the processors 213-1 to 213-3 (e.g., GPUs, CPUs, FPGAs, and the like) all have different functional rates of execution based on the memory structure for the function f(x). Therefore, the deployment topology generator 320 generates, based on the determined deployment criteria, the plurality of topologies in terms of different compute implementations and how they interact with the available memory, such that the media production optimizer 101 able to determine how the function f(x) will perform and how it should be placed in the cloud computing network 110 to optimize execution and performance while also balancing user constraints, such as time and cost, for example.

As further shown, the media production optimizer 101 includes a deployment optimizer 325 that is configured to select an optimal topology of the plurality of topologies to deploy the processing function f(x) within the cloud computing network 110. In an exemplary aspect, the optimal topology is selected to include at least one processor (e.g., one or more of processors 113-1 to 113-3) for optimizing accessibility of the electronic memory (e.g., memory 114-1 to 114-2) to execute the atomic compute function of function f(x). Moreover, the memory capabilities and location within the network will impact the carrying out of the function f(x). In an exemplary aspect, the accessibility can be optimized based on at least one of a network type, network bandwidth, network latency, processor type, and processor location within the cloud computing network 110. Thus, the deployment optimizer 325 can be configured to select the optimal topology for performing the processing function f(x) to minimize time, for example, or maximize quality in another example.

More specifically, in the cloud, the deployment optimizer 325 may select a CPU, a GPU or an FPGA, or a combination thereof, for a given function f(x) for deployment thereon for the workflow. As noted above, the different topologies may be slightly different for each configuration. For example, different quantization errors may occur based on available arithmetic options in each of the CPU, GPU or FPGA. Another difference could be that compute time could vary significantly, but if the process can wait, the solution might cost less to calculate. In a third difference, the "cloud" might actually reside on premise as a collection of compute nodes, rather than in an offsite data center, essentially, the cloud. This might be done for reasons of transmission bandwidth, security or both. However, each of these resources may be configured to perform the same function f(x), but with different capabilities (e.g., bandwidth, latency, FLOPs) and/or a different capacity (e.g., 10 Gbps, 5 msec, 1 TeraFlop). These variations in potential deployments enables the deployment optimizer 325 select an optimal topology for deploying the specific function, while balancing cost and time constraints. In other words, the deployment optimizer 325 is configured to determine cost (e.g., latency, economic, quality and the like) by executing the function f(x) on different heterogeneous machines in the cloud computing environment based on metadata 215 as described above. Moreover, since each atomic compute function is "stateless", and any cascade, or combination of atomic functions receives and propagates information in an acyclic connected way, the function f(x) can be presumed predictable and stable, which enables the deployment optimizer 325 to also determine these costs with predictability. As a result, the deployment optimizer 325 can select the optimal topology for deployment of the function f(x) since its input is predictable and the topology configuration can be selected for optimizing costs, latency, power requirements, and the like. As such, any operation (e.g., decimation, discrete cosine transform (DCT), and the like), can be carried out by any of the plurality of resources in the network 110.

In a refinement of this exemplary aspect, the deployment optimizer 325 is further configured to dynamically update the selected optimal topology based on changes of the data feeds, for example. In other words, a first topology of the plurality of topologies generated by deployment topology generator 320 may be selected when the data set is a first type of data input (e.g., a first type of data conversion), but the deployment optimizer 325 may be configured to dynamically change its determination of the optimal topology if this data input because a second type (e.g., if the user updates the workflow).

In yet a further aspect, the deployment optimizer 325 may be further configured to determine the sequence count and timing for transmitting the media essence across the network (e.g., between nodes), as described in U.S. Provisional application Ser. No. 17/233,256, filed Apr. 16, 2021, and entitled "System and Method for Controlling Distribution of Media Content in a Distributed System", the contents of which are hereby incorporated by reference in their entirety. In this access, the sequence timing is also stably predictable as the media content is "pulled" from a given source node and can be assigned to any set of resources that are available at a given time or for a given cost. In turn, once the processes and their sequence time are provided to the compute engine (e.g., the deployment optimizer 325), media can be distributed in the pulled manner for the processing function f(x) to operate on. Because each node in the media distribution network is provided its event list, count sequence, and the media, the node is free to carry out the pull process at any rate that satisfies the requirements of the media access request. Knowledge and predictability of these timing sequences enables the deployment optimizer 325 to dynamically change its determination of the optimal topology if this data input because a second type (e.g., if the user updates the workflow).

In either case, once the deployment optimizer 325 determines the optimal topology for deploying the stated function f(x), the deployment optimizer 325 can be further configured to decompose the function f(x) to one or more atomic functions to be allocated to the specific machines in the cloud computing network 110 as described herein.

It is also noted that the deployment optimizer 325 can be configured to deploy the function f(x) to the cloud using various techniques as would be appreciated to one skilled in the art. For example, in one aspect, IAC and CAC enables porting (or "lift and shift") that effectively migrates the processing function f(x) to the cloud platform (which includes the media production processing components described above). In turn, the cloud computing platform can receive the request and dynamically modify the configurations for function f(x) in response to the request from the deployment optimizer 325 dynamically adjust the configuration. In an alternative aspect, the function f(x) can be configured as one or more containers within the cloud platform, such that the deployment optimizer 325 is configured to generate a new container with an update of the workflow application once the optimal topology is determined. This new container can then be provided to the cloud platform 110.

Figure 4:
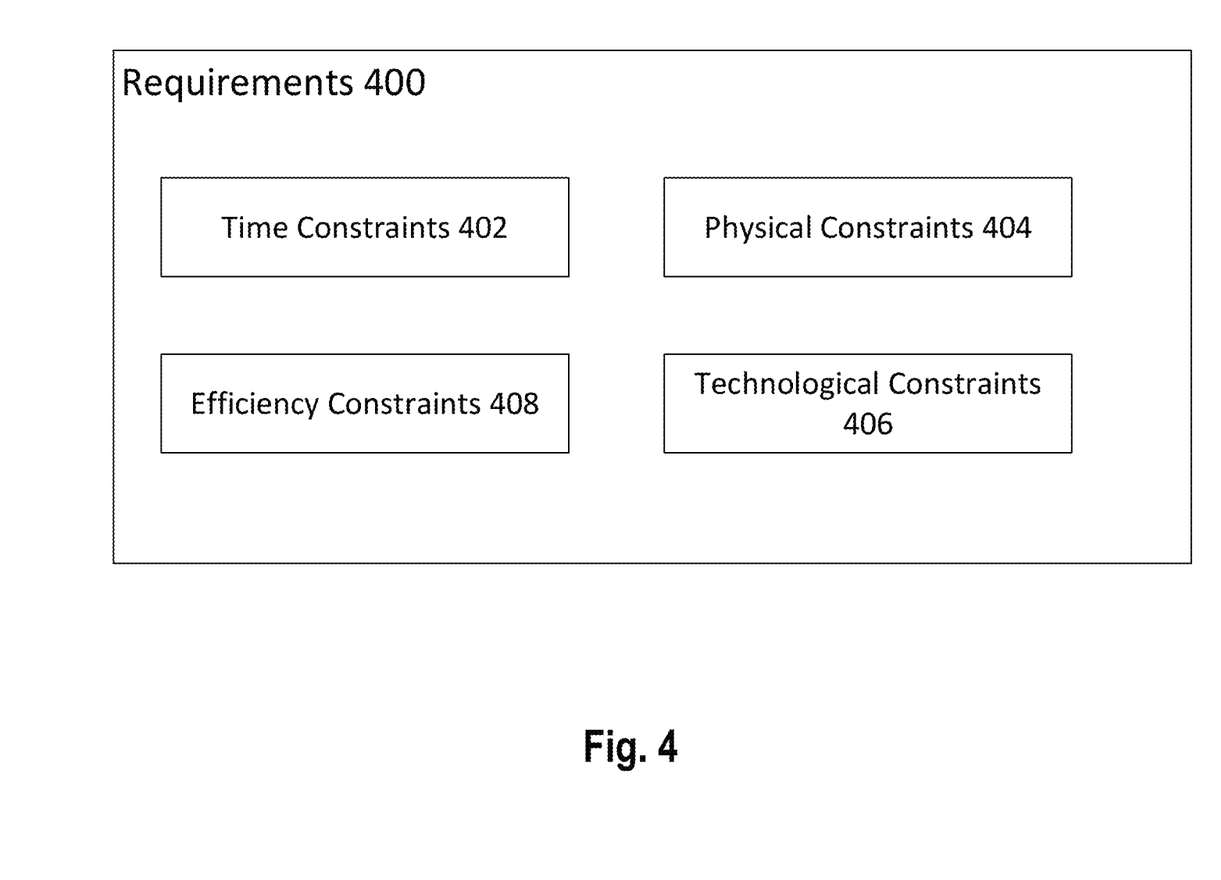
FIG. 4 is a block diagram illustrating exemplary requirements according to an exemplary aspect of the disclosure.

As also described above, the function deployment optimizer 101 is configured to deploy the function f(x) to satisfy one or more defined requirements/criteria. FIG. 4 is a block diagram illustrating exemplary requirements 400 according to an exemplary aspect of the disclosure. As described above, the requirements 400 defined or otherwise obtained (e.g., by a user input) by function deployment optimizer 101 can be set for the requested function f(x). More particularly, the requirements 400 can be a set of constraints to execute the function f(x) according to certain defined thresholds for that function within the media processing workflow.

As specifically shown in FIG. 4, the requirements 400 can be defined by time constraints 402, physical constraints 404, technological constraints 406 and/or efficiency constraints 408. For example, if function f(x) must be performed within a certain timeframe (e.g., a time threshold defined by a user via user interface 305), and computing resources are required for completing a portion or all of the task, the time constraints 402 can be defined accordingly (e.g., complete a task within one hour), which will in turn define the possible combinations of computing processor requirements needed to satisfy the defined time constraints 402. Similar determinations can be made for each of the physical constraints 404, technological constraints 406 and/or efficiency constraints 408. For example, if the requested task is editing of live video content, the required bit depth, luminance, color volume, and the like, can be determined based on the defined workflow. The required video characteristics can be specified in the technological constraints 406 of the requirements 400. Other criteria could be, for example, a processor type as discussed earlier, and/or a particular cost associated with the resource. It should be appreciated that at least these each of these criteria can be used, singularly or in total, to determine the optimal topology for executing the processing function f(x) by deployment optimizer 325 as described above.

Using the computing processor requirements as an example, the system can be configured to perform the function f(x) routing differently for the required processes and allocating memory accordingly. In other words, the system does not simply swap a CPU-based task (e.g., a first topology) to an FPGA-based task (e.g., a second topology), but the system can be configured to dynamically determine multiple topologies (e.g., one FPGA vs. ten CPUs running in parallel) in order to then determine the optimal deployment based on one or more of requirements 400, for example. That is, based on the results obtained by metadata collection module 212 for the availabilities and capabilities of the available devices (e.g., resources 213-1 to 214-2), the function deployment optimizer 101 can determine an optimal combination (i.e., configuration) of one or more resources for deploying and executing function f(x) within the workflow. For example, at the micro scale, the function deployment optimizer 101 can effectively remap each decomposed atomic function and, at the macro scale, the system can remap whole subsystems and achieve very different attributes or properties of the process.

Figure 5:
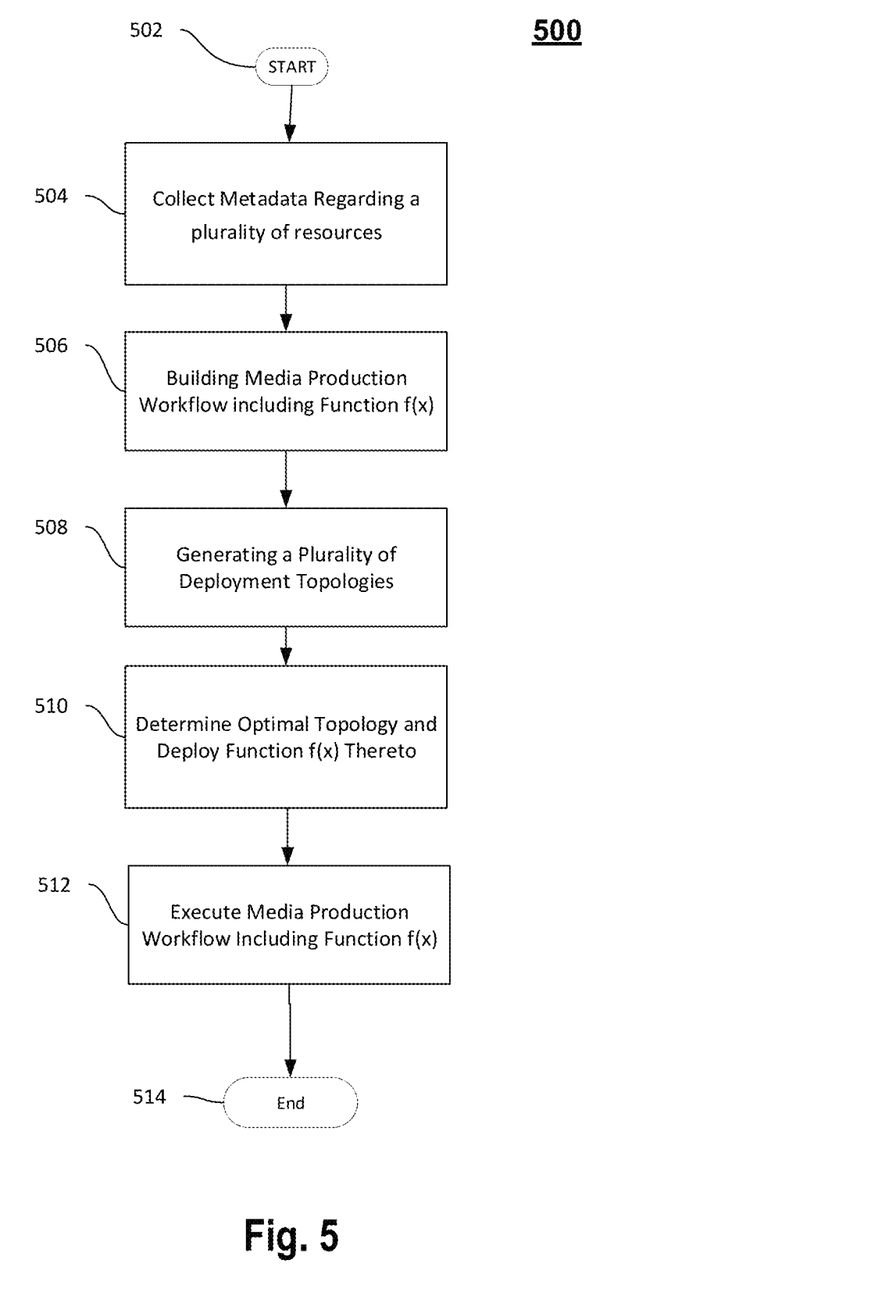
FIG. 5 illustrates a flowchart for a method for optimizing deployment of a processing function in a media production workflow according to an exemplary embodiment.

FIG. 5 illustrates a flowchart for a method for optimizing deployment of a processing function in a media production workflow according to an exemplary embodiment. In general, it should be appreciated that the method 500 can be executed using one or more of the components described above with respect to FIGS. 1-4. As shown, the method begins at Step 502 when a user, for example, begins building a workflow for media production.

At Step 504, the system is configured to collect or otherwise obtain, from a media processing resource database, metadata associated with a plurality of resources available in a cloud computing network. These resources can include both physical resources and software resources, with the resources comprising a plurality of processors and electronic memory accessible by the plurality of processors, for example. Next, at Step 506, a media production workflow generator builds a media production workflow that includes the processing function f(x). It is noted that Steps 504 and 506 can be performed in any sequence and/or in parallel. During Step 506, the media production workflow generator can further be configured to determine deployment criteria for the processing function f(x) that includes an input dataset for the processing function and at least one atomic compute function for executing the processing function f(x) within the generated media production workflow.

At Step 508, a deployment topology generator generates a plurality of topologies (e.g., deployment configurations) of the plurality of resources available in the cloud computing network and based on the determined deployment criteria. In this aspect, the generated plurality of topologies indicate different configurations of the physical and software resources for executing the processing function f(x). Moreover, at least one of the plurality of processors is configured for executing the atomic compute function of the processing function in an exemplary aspect.

At Step 510, a deployment optimizer selects an optimal topology of the plurality of topologies to deploy the processing function within the cloud computing network. In one aspect, the optimal topology is automatically selected to include the at least one processor for optimizing accessibility of the electronic memory to execute the atomic compute function, and the accessibility optimized based on at least one of a network type, network bandwidth, network latency, processor type, and processor location within the cloud computing network. Alternatively, it should be appreciated that a user can select the desired topology for executing the processing function f(x) using user interface 305, for example.

Finally, at Step 512, once the one or more functions f(x) are deployed according to the selected configuration in the cloud computing network, the media production workflow can be implemented to perform a real-time video production, for example. That is, the video production is executed and includes the deployed functions f(x), which are configured based on criteria defined by a user or system, for example. That is, even though the cloud computing platform/network has a fixed set of resources (e.g., processors 213-1 to 213-3 and memory 214-1 to 214-2), the whole machine (e.g., combination of resources) is elastic based on the variations of possible deployment topologies. As a result, the optimization deployment system can mutate the one or more machines that function f(x) runs on to optimize the accessibility of the memory load. Thus, during execution of the workflow, the input data (at that stage of the workflow) can be delivered to the selected machines/resources for executing the processing function f(x) and then returned as part of the flow of the media production as defined in the workflow.

Figure 6:
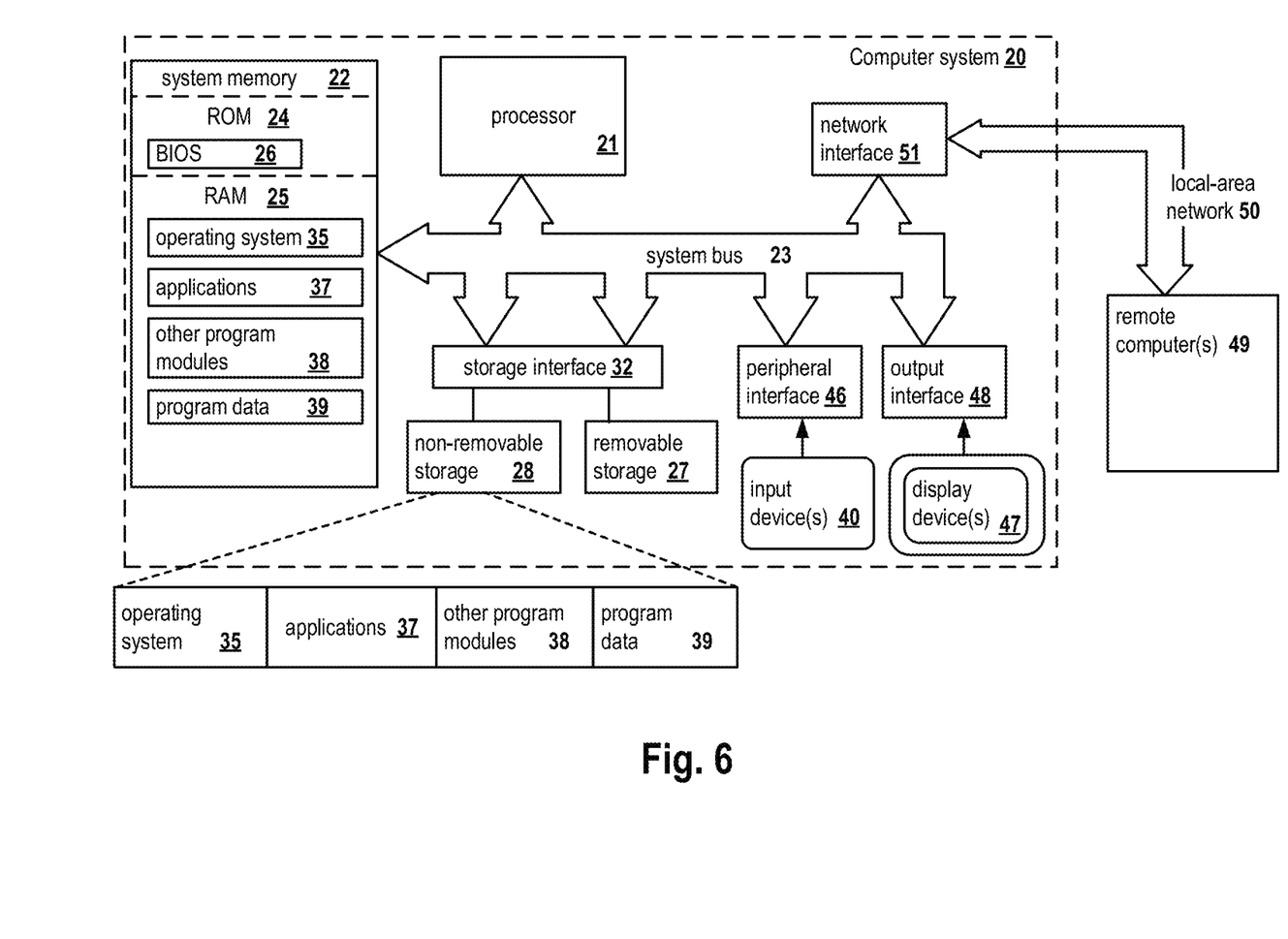
FIG. 6 is a block diagram illustrating a computer system on which aspects of systems and methods for optimizing deployment of a processing function in a media production workflow according to an exemplary embodiment.

FIG. 6 is a block diagram illustrating a computer system 20 on which aspects of systems and methods for optimizing deployment of a processing function in a media production workflow according to an exemplary embodiment. It should be noted that the computer system 20 can correspond to the system 100 or any components therein, including, for example, function deployment optimizer 101. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. In an exemplary aspect, the one or more remote computers 49 can correspond to the cloud computing network 110 as described above.

In general, exemplar aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for optimizing deployment of a processing function in a media production workflow, the system comprising:
 a media processing resource database comprising metadata associated with a plurality of resources available in a cloud computing network that includes both physical resources and software resources, with the resources comprising a plurality of processors and electronic memory accessible by the plurality of processors;
 a media production workflow generator configured to build the media production workflow that includes the processing function and to determine deployment criteria for the processing function that includes an input dataset for the processing function and at least one atomic compute function for executing the processing function within the generated media production workflow;

a deployment topology generator configured to generate a plurality of topologies of the plurality of resources available in the cloud computing network and based on the determined deployment criteria, with the generated plurality of topologies indicating different configurations of the physical and software resources for executing the processing function and at least one of the plurality of processors configured for executing the atomic compute function of the processing function; and a deployment optimizer configured to select an optimal topology of the plurality of topologies to deploy the processing function within the cloud computing network, with the optimal topology being selected to include the at least one processor for optimizing accessibility of the electronic memory to execute the atomic compute function, and the accessibility optimized based on at least one of a network type, network bandwidth, network latency, processor type, and processor location within the cloud computing network;

wherein the plurality of processors includes at least one of a computer processing unit (CPU), a graphics processing unit (GPU), and a field programmable gate array (FPGA);

wherein the deployment topology generator is configured to generate the plurality of topologies such that the processing function is executed at or below a maximum required time threshold, and wherein the deployment optimizer is further configured to dynamically select a different topology of the plurality of topologies to deploy the processing function within the cloud computing network in response to a change of at least one of a format and a type of the input dataset.

2. The system according to claim 1, wherein the deployment optimizer is further configured to decompose the processing function into a plurality of atomic functions that are allocated to respective resources of the plurality of resources available in the cloud computing network.

3. The system according to claim 1, wherein the deployment optimizer is further configured to select the optimal topology of the plurality of topologies based on availabilities and capabilities of the plurality of resources in the cloud computing network.

4. The system according to claim 3, wherein the deployment topology generator is configured to query the media processing resource database to identify the plurality of resources available in the cloud computing network and the respective capabilities of the plurality of resources.

5. The system according to claim 4, wherein each resource of the plurality of resources available in the cloud computing network comprises a unique resource ID that includes metadata indicating the capabilities of the respective resource, such that the deployment topology generator is configured to generate the plurality of topologies of the plurality of resources available in the cloud computing network based on the unique resource ID for each resource.

6. The system according to claim 1, wherein the input dataset comprises video content provided by at least one content generating device for production of a media production by the media production workflow and the processing function comprises at least one of image scaling, encoding and decoding of the video content.

7. A system for optimizing deployment of a processing function in a media production workflow, the system comprising:

a media processing resource database comprising metadata associated with a plurality of resources available in a cloud computing network that includes both physical resources and software resources, with the resources comprising a plurality of processors and electronic memory accessible by the plurality of processors;

a media production workflow generator configured to build the media production workflow that includes the processing function and to determine deployment criteria for the processing function that includes an input dataset for the processing function and at least one atomic compute function for executing the processing function within the generated media production workflow;

a deployment topology generator configured to generate a plurality of topologies of the plurality of resources available in the cloud computing network and based on the determined deployment criteria, with the generated plurality of topologies indicating different configurations of the physical and software resources for executing the processing function and at least one of the plurality of processors configured for executing the atomic compute function of the processing function; and a deployment optimizer configured to select an optimal topology of the plurality of topologies to deploy the processing function within the cloud computing network, with the optimal topology being selected to include the at least one processor for optimizing accessibility of the electronic memory to execute the atomic compute function, wherein the deployment optimizer is further configured to dynamically select a different topology of the plurality of topologies to deploy the processing function within the cloud computing network in response to a change of at least one of a format and a type of the input dataset.

8. The system according to claim 7, wherein the deployment optimizer is further configured to select the optimal topology to optimize the accessibility of the electronic memory to execute the atomic compute function based on at least one of a network type, network bandwidth, network latency, processor type, and processor location within the cloud computing network.

9. The system according to claim 7, wherein the plurality of processors includes at least one of a computer processing unit (CPU), a graphics processing unit (GPU), an a field programmable gate array (FPGA).

10. The system according to claim 7, wherein the deployment topology generator is configured to generate the plurality of topologies such that the processing function is executed at or below a maximum required time threshold.

11. The system according to claim 7, wherein the deployment optimizer is further configured to decompose the processing function into a plurality of atomic functions that are allocated to respective resources of the plurality of resources available in the cloud computing network.

12. The system according to claim 7, wherein the deployment optimizer is further configured to select the optimal topology of the plurality of topologies based on availabilities and capabilities of the plurality of resources in the cloud computing network.

13. The system according to claim 12, wherein the deployment topology generator is configured to query the media processing resource database to identify the plurality of resources available in the cloud computing network and the respective capabilities of the plurality of resources, and wherein each resource of the plurality of resources available in the cloud computing network comprises a unique resource ID that includes metadata indicating the capabilities of the respective resource, such that the deployment topology generator is configured to generate the plurality of topologies of the plurality of resources available in the cloud computing network based on the unique resource ID for each resource.

14. The system according to claim 7, wherein the input dataset comprises video content provided by at least one content generating device for production a media production by the media production workflow and the processing function comprises at least one of image scaling, encoding and decoding of the video content.

15. A system for optimizing deployment of a processing function in a media production workflow, the system comprising:
- a media production workflow generator configured to build the media production workflow that includes the processing function and to determine deployment criteria for the processing function that includes an input dataset for the processing function and at least one atomic compute function for executing the processing function within the generated media production workflow;
- a deployment topology generator configured to generate a plurality of topologies of a plurality of resources available in a cloud computing network and based on the determined deployment criteria, with the generated plurality of topologies indicating different configurations of physical and software resources for executing the processing function and at least one of a plurality of processors configured for executing the atomic compute function of the processing function; and
- a deployment optimizer configured to select an optimal topology of the plurality of topologies to deploy the processing function within the cloud computing network, with the optimal topology being selected to include the at least one processor for optimizing accessibility of electronic memory to execute the atomic compute function,
- wherein the deployment optimizer is further configured to dynamically select a different topology of the plurality of topologies to deploy the processing function within the cloud computing network in response to a change of at least one of a format and a type of the input dataset.

16. The system according to claim 15, wherein the deployment optimizer is further configured to select the optimal topology to optimize the accessibility of the electronic memory to execute the atomic compute function based on at least one of a network type, network bandwidth, network latency, processor type, and processor location within the cloud computing network.

17. The system according to claim 16, wherein the deployment topology generator is configured to generate the plurality of topologies such that the processing function is executed at or below a maximum required time threshold.

18. The system according to claim 15, wherein the deployment optimizer is further configured to decompose the processing function into a plurality of atomic functions that are allocated to respective resources of the plurality of resources available in the cloud computing network.

19. The system according to claim 15, wherein the deployment optimizer is further configured to select the optimal topology of the plurality of topologies based on availabilities and capabilities of the plurality of resources in the cloud computing network.

20. The system according to claim 19,
- wherein the deployment topology generator is configured to query a media processing resource database to identify the plurality of resources available in the cloud computing network and the respective capabilities of the plurality of resources, and
- wherein each resource of the plurality of resources available in the cloud computing network comprises a unique resource ID that includes metadata indicating the capabilities of the respective resource, such that the deployment topology generator is configured to generate the plurality of topologies of the plurality of resources available in the cloud computing network based on the unique resource ID for each resource.

21. The system according to claim 15, wherein the input dataset comprises video content provided by at least one content generating device for production a media production by the media production workflow and the processing function comprises at least one of image scaling, encoding and decoding of the video content.

* * * * *